Figure 1:
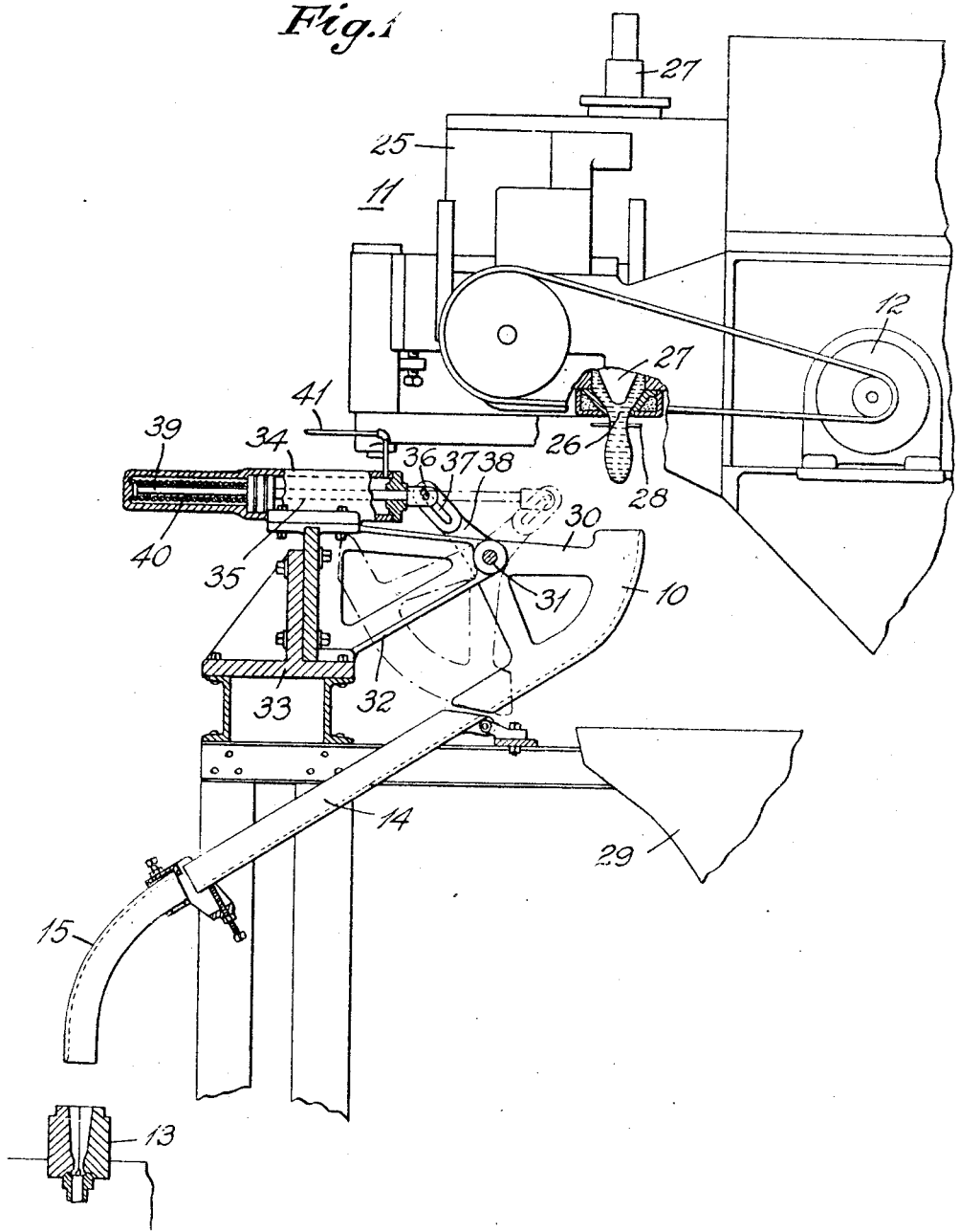

May 22, 1928.

H. W. INGLE 1,670,770

DELIVERY APPARATUS FOR MOLTEN GLASS

Filed June 10, 1926     2 Sheets-Sheet 1

Inventor
H. W. Ingle
by Robson D. Brown
Attorney.

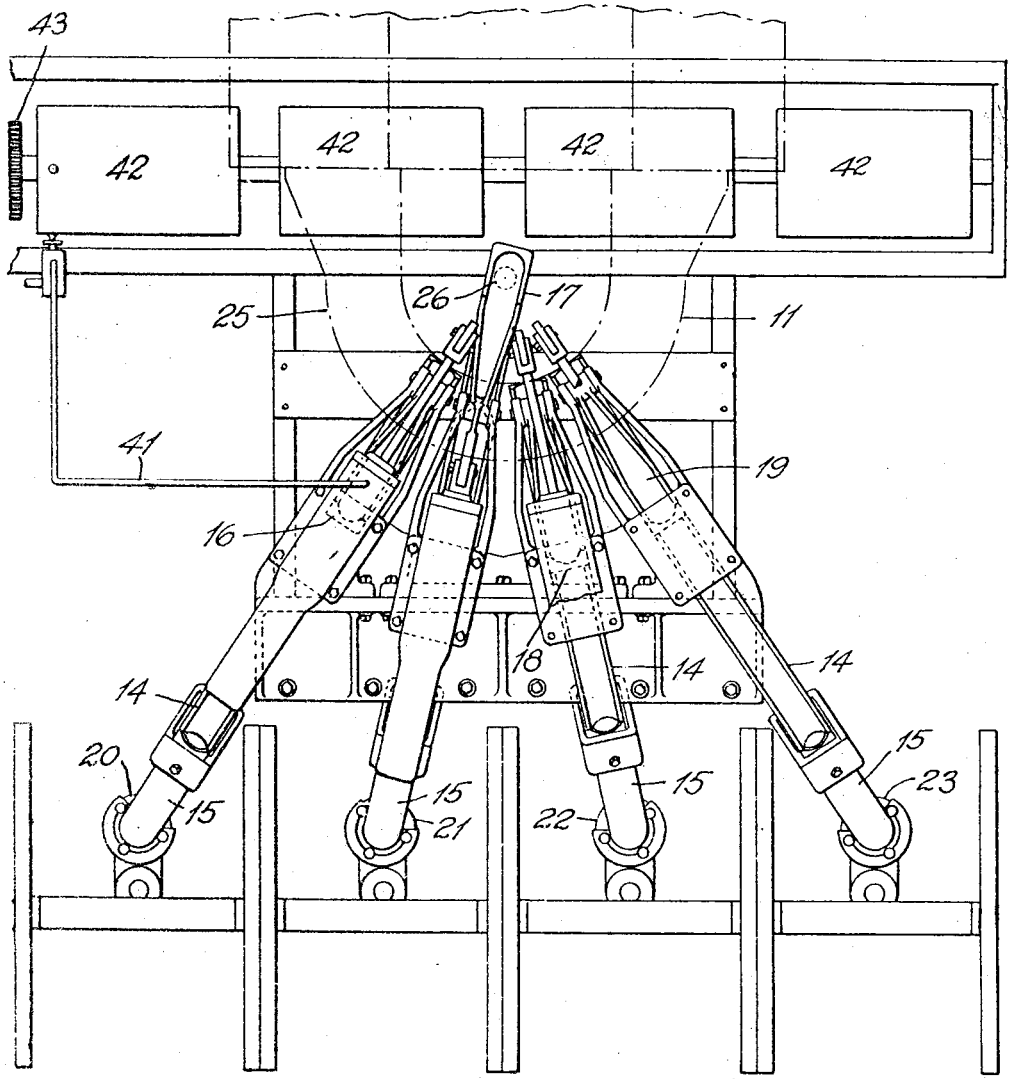

Patented May 22, 1928.

1,670,770

UNITED STATES PATENT OFFICE.

HENRY W. INGLE, OF HARTFORD, CONNECTICUT, ASSIGNOR TO HARTFORD-EMPIRE COMPANY, OF HARTFORD, CONNECTICUT, A CORPORATION OF DELAWARE.

DELIVERY APPARATUS FOR MOLTEN GLASS.

Application filed June 10, 1926. Serial No. 115,056.

My invention relates to apparatus for delivering mold charges of molten glass to the molds of glassware shaping machines, and it relates more particularly to mechanisms adapted to deliver mold charges from one glass feeder to the molds of a plurality of shaping machines.

One object of my invention is to provide such glass delivery apparatus with improved mechanism for operating a plurality of delivery devices, hereinafter called scoop blocks, in a desired sequence to receive mold charges of molten glass from the discharge outlet of an automatic feeder and to deliver the charges in proper order to designated molds of a plurality of shaping machines. This object is accomplished by pivotally mounting the scoop blocks about the feeder outlet in any convenient manner and providing individual operating means for rocking each scoop block about its pivot axis so that it may be moved from a non-delivery position into glass-delivery alignment with the feeder outlet and with its associated shaping machine.

More specifically, my invention contemplates pivotally mounting each scoop block between the feeder outlet and a designated trough section, usually associated with one of the shaping machines, and providing a fluid-operated cylinder to rock the scoop block below a horizontal axis and thereby to cause the scoop block to move into and out of glass-delivery alignment with the feeder and with its trough section. The arrangement and timing of the operation of the scoop blocks is such that, after one scoop has received and delivered a charge, it is then moved out of alignment with its corresponding trough and away from the feeder outlet in order to permit another scoop to be brought into glass-receiving position beneath the feeder outlet and into delivery alignment with another trough section to deliver a mold charge to another shaping machine. By thus timing the actuation of individually operated delivery devices, mold charges may be delivered to the molds of the several shaping machines in any desired sequence.

Other objects of the invention include such novel features of construction and arrangement of parts as are disclosed in the following specification and drawings, and specifically set forth in the appended claims.

In the drawings,

Figure 1 is a side elevational view, partially in section, of a glass delivery apparatus embodying my invention, showing also a feeder for supplying mold charges, and Fig. 2 is a diagrammatic illustration of glass delivery apparatus embodying my invention as applied to four glassware shaping machines.

Referring to Figure 1 of the drawing, there is shown a glass delivery apparatus embodying the present invention in which a scoop block 10 is located below the discharge outlet of a glass feeder 11, which is operated from any convenient source of power, such as an electric motor indicated by the numeral 12. The scoop block is pivotally mounted near the feeder outlet so that it may be swung about its pivot axis and moved into and out of glass delivery alignment with the glass feeder outlet and a mold 13, which may be of the movable type located on a rotary mold table or of the stationary type. Whichever form is employed, communication is afforded by means of adjustably mounted trough sections 14 and 15. In Fig. 2 there is shown a plurality of independently operated delivery devices indicated by the numerals 15, 16, 17 and 18, arranged about the feeder 11 and adapted to supply mold charges to a plurality of molds. Each of the delivery devices embodies an arrangement of parts as above described and are indicated by the numerals 16, 17, 18 and 19, and the devices are positioned to deliver mold charges to their respective molds which are of the stationary type and indicated by the numerals 20, 21, 22 and 23 respectively. When a plurality of scoops are employed, these may be operated in any desired sequence to effect the proper delivery of mold charges to the designated molds.

In the illustrated embodiment of the invention, the glass feeder 11, for supplying mold charges to the delivery scoops, is shown as a conventional type of feeder embodying a forehearth 25 connected to a glass melting tank (not shown). The forehearth is provided with a discharge outlet 26 and mold charges of glass are discharged from the outlet under the influence of a plunger 27 and cooperating shear members indicated by the numeral 28. These feeding implements may be operated in any desired manner to discharge mold charges of a predetermined size and shape. When a scoop fails to receive its mold charge from the feeder for any reason, the charge is received in a suitable cullet receptacle 29 without disturbing the operation of the feeder.

The delivery devices may be of any convenient shape to facilitate the reception of glass from the feeder outlet and are separately mounted and individually operated as hereinafter described. As shown, the scoop block 10 is of arcuate shape and is carried by a swinging frame 30 which is suspended from a pivotal support axis 31 located beneath the feeder outlet and to one side thereof. The scoop block, together with its associated operating mechanism, is mounted adjacent to the feeder in any suitable manner, as for example by a bracket 32 secured to a support indicated by the numeral 33.

The operating mechanism for each of the scoop blocks comprises a separately mounted fluid pressure cylinder 34 and a reciprocable piston and rod 35 associated therewith. The piston rod for actuating each scoop block is connected thereto by means of a slidable connection including a pin 36 which engages a slot 37 formed in an arm 38 connected to the scoop block frame 30. The piston 35 is provided with a rearward rod extension 39 which serves as a guide for a compression spring 40 which is housed within an extension of the casing of the cylinder 34. This slidable connection between the piston rod and the scoop frame permits the piston to positively actuate the scoop without the aid of links or similar connections which are subject to wear.

Fluid pressure from any suitable source, indicated by the conduit 41, is periodically admitted to the cylinder 34 to move the piston 35 to the left, (Fig. 1) thereby swinging the scoop into its glass delivery position and compressing the spring 40. When the fluid pressure is relieved, the spring 40 moves the piston to the right, thereby returning the scoop to its non-delivering position.

Should the fluid pressure fail for any reason, the compression spring 40 positively holds the scoop block in its dotted line position, where it is out of glass-receiving position beneath the feeder outlet. This feature is particularly desirable for automatic operation in timed relation with the feeding device or with the mold operating device, since the present construction prevents any glass from coming into contact with any part of the delivery mechanism or the shaping machine, when the air pressure fails, by being cut off by the operator, or upon failure of operation of the feeder or the shaping machine.

By arranging the scoop block to swing beneath its pivot axis, a desirable mechanical advantage is obtained from this construction. As the scoop swings from the non-delivery position to glass delivery position and return, gravity aids in initiating these two movements and thus a small operating mechanism may be employed to actuate the scoop. Since gravity initiates each swinging movement of the scoop, the actuating arm and associated devices may have a relatively short range of movement, thereby enabling the operating mechanism to be made more durable and conveniently enclosed in a unit housing.

When a plurality of scoop blocks are arranged about a feeder outlet to feed a plurality of separate mold devices, as shown in Fig. 2, the operation of each of the scoop blocks may be timed with the operation of its associated mold by any suitable timing mechanism, or it may be timed with the feeder. I preferably employ an independently operated rotary timer such as that indicated by the drums 42 which are each provided with a plurality of adjustable studs arranged to periodically trip suitable air valves for controlling the sequence of operation of the several scoop block mechanisms. Drum 42 on the left is shown as arranged to control the actuation of delivery device 16. The drum or drums for timing the delivery devices may be independently operated from any suitable source of power indicated by a gear 43. Since this timer forms no part of my present invention, reference may be had to my copending application Serial No. 785,079 for a more detailed description thereof.

Variations in the construction and arrangement of parts may be made within the scope of my invention, as set forth in the appended claims.

I claim as my invention:

1. Apparatus for delivering compact mold charges of molten glass en masse from a glass feeder to a mold, which comprises a delivery member mounted on a horizontal pivot, and means for swinging the delivery member below its pivot axis to move said member between a position in which it is out of operative relation with both the feeder and with the mold and a position in which it is in operative relation with both the feeder and with the mold to deliver a mold charge to said mold.

2. Apparatus for delivering compact mold charges of molten glass en masse from a glass feeder to a plurality of separately operated mold devices, which comprises a delivery member for each mold device, said delivery member being mounted on a horizontal pivot, and means for swinging each delivery member below its pivot to successively move said delivery members into and out of glass delivery relation with both the feeder and with a designated mold, to deliver a mold charge to said mold devices.

3. Apparatus for delivering compact mold charges of molten glass en masse from a glass feeder to a mold, which comprises a delivery member mounted on a horizontal pivot, and a fluid pressure mechanism for swinging the delivery member below its pivot to move said member vertically into and out of glass delivery relation with both the feeder and with the mold, to deliver a mold charge to said mold.

4. Apparatus for delivering compact mold charges of molten glass en masse from a glass feeder to a mold, which comprises a delivery member mounted on a horizontal pivot positioned between the outlet and the mold, a fluid pressure mechanism for swinging the delivery member about its pivot to move said member vertically into and out of glass delivery relation with both the feeder and with the mold, and resilient means for retracting the delivery member to non-delivery position.

5. In apparatus for delivering compact mold charges of molten glass en masse from a glass feeder to a mold, the combination of a delivery member mounted on a horizontal pivot positioned between the feeder and the mold, a fluid pressure mechanism connected to the delivery member and comprising a casing, a fluid operated piston therein, a spring arranged to operatively engage the piston and the casing, and means for admitting fluid pressure to the piston to move the delivery member into glass delivery relation with both the feeder and with the mold, said spring being adapted to return the piston and thereby retract the delivery member to non-receiving position when the pressure on the piston is released.

6. Apparatus for delivering mold charges of molten glass from a container having a discharge outlet comprising a support, a frame pivotally mounted on the support, a delivery member carried by the frame and adapted to swing about its pivot support, a lever arm connected to the frame, a slot provided in one extremity of the arm, a fluid pressure mechanism mounted on the support for actuating the delivery member and including a casing, a reciprocable piston in said casing provided with a rod extending rearwardly from the piston and contained within the casing and a piston rod projecting from the casing and adapted to connect with the slot in the arm, a coil spring surrounding the rearwardly extending rod and engaging the piston and the rear walls of the casing, and means for admitting fluid pressure to the cylinder for moving the piston in one direction to actuate the delivery member and to compress the spring, whereby the spring returns the piston when the fluid pressure is released.

7. Apparatus for delivering mold charges of molten glass from the discharge outlet of a container to a mold, comprising a support, a frame pivotally mounted on the support and adapted to swing below its pivot axis, a delivery member carried by the frame, a lever connected to the frame, a fluid pressure cylinder mounted on the support, a reciprocable piston associated with the cylinder for actuating the delivery member, means for connecting the piston rod to the lever, a spring connecting the piston with the cylinder, means for admitting fluid pressure to the cylinder to cause the piston rod to swing the delivery member into glass delivery relation with the discharge outlet and the mold, and means for releasing the fluid pressure, thereby permitting the spring to return the delivery member to non-delivery position.

8. Apparatus for delivering mold charges of molten glass from the discharge outlet of a container to a mold, comprising a support, a frame pivotally mounted on the support and adapted to swing below its pivot axis, a delivery member carried by the frame, a lever connected to the frame, a fluid pressure cylinder mounted on the support, a reciprocable piston associated with the cylinder for actuating the delivery member, a pin and slot mechanism for connecting the piston rod to the lever, and means for admitting fluid pressure to the cylinder to cause the piston rod to swing the delivery member into glass-delivery relation with the discharge outlet and the mold.

9. Apparatus for delivering compact mold charges of glass from a glass feeder to a mold, comprising a trough shaped delivery member, a support, a frame for the member pivotally suspended from the support, said frame arranged to swing below its pivotal axis to move said member into and out of glass delivery relation relative to the feeder outlet and the mold, means for swinging the delivery member from non-delivery position at one side of the pivotal axis to a glass delivery position at the opposite side of said pivotal axis, and resilient means for returning the delivery member to non-delivery position.

10. Apparatus for delivering compact mold charges of glass from a glass feeder to a mold, comprising a trough shaped delivery member, a support, a frame for the member pivotally suspended from the support, said frame arranged to position said member in glass delivery relation relative to the feeder outlet and the mold, means for swinging the delivery member from non-delivery position at one side of the pivotal axis to a delivery position at the opposite side of said pivotal axis, means for returning the member to non-delivery position, and means for permitting gravity to initiate each swinging movement.

11. Apparatus for delivering mold charges of molten glass from a glass feeder to a mold, comprising a trough shaped delivery member, a bracket for supporting the delivery member, a frame pivotally suspended from the bracket and adapted to carry the delivery member beneath the pivot from a non-delivery position at one side of its pivotal axis to a glass delivery position on the opposite side of said pivotal axis, a fluid pressure mechanism for actuating the delivery member, and a pin and slot mechanism for connecting the fluid pressure mechanism to said delivery member.

12. In combination with a glass feeding device adapted to preform and sever in suspension mold charges of molten glass and molds wherein such charges are fabricated into glassware, of a charge guiding device comprising a delivery member for each mold, said delivery member being mounted on a horizontal pivot, and means for swinging each delivery member below its pivot to successively move it into and out of guiding position in registry with both the feeding device and the mold, whereby successive mold charges may be delivered en masse to successive molds.

Signed at Hartford, Connecticut, this 27th day of May 1926.

HENRY W. INGLE.

side of said pivotal axis, means for returning the member to non-delivery position, and means for permitting gravity to initiate each swinging movement.

11. Apparatus for delivering mold charges of molten glass from a glass feeder to a mold, comprising a trough shaped delivery member, a bracket for supporting the delivery member, a frame pivotally suspended from the bracket and adapted to carry the delivery member beneath the pivot from a non-delivery position at one side of its pivotal axis to a glass delivery position on the opposite side of said pivotal axis, a fluid pressure mechanism for actuating the delivery member, and a pin and slot mechanism for connecting the fluid pressure mechanism to said delivery member.

12. In combination with a glass feeding device adapted to preform and sever in suspension mold charges of molten glass and molds wherein such charges are fabricated into glassware, of a charge guiding device comprising a delivery member for each mold, said delivery member being mounted on a horizontal pivot, and means for swinging each delivery member below its pivot to successively move it into and out of guiding position in registry with both the feeding device and the mold, whereby successive mold charges may be delivered en masse to successive molds.

Signed at Hartford, Connecticut, this 27th day of May 1926.

HENRY W. INGLE.

CERTIFICATE OF CORRECTION.

Patent No. 1,670,770.   Granted May 22, 1928, to

HENRY W. INGLE.

It is hereby certified that error appears in the printed specification of the above numbered patent requiring correction as follows: Page 3, lines 106 and 121, claims 9 and 10 respectively, after the word "glass" insert the words "en masse"; and that the said Letters Patent should be read with this correction therein that the same may conform to the record of the case in the Patent Office.

Signed and sealed this 10th day of July, A. D. 1928.

(Seal)

M. J. Moore,
Acting Commissioner of Patents.